Feb. 12, 1929.
B. F. NEWSOM
1,701,893
COTTON CHOPPER ATTACHMENT FOR CULTIVATORS
Filed April 21, 1928  3 Sheets-Sheet 1
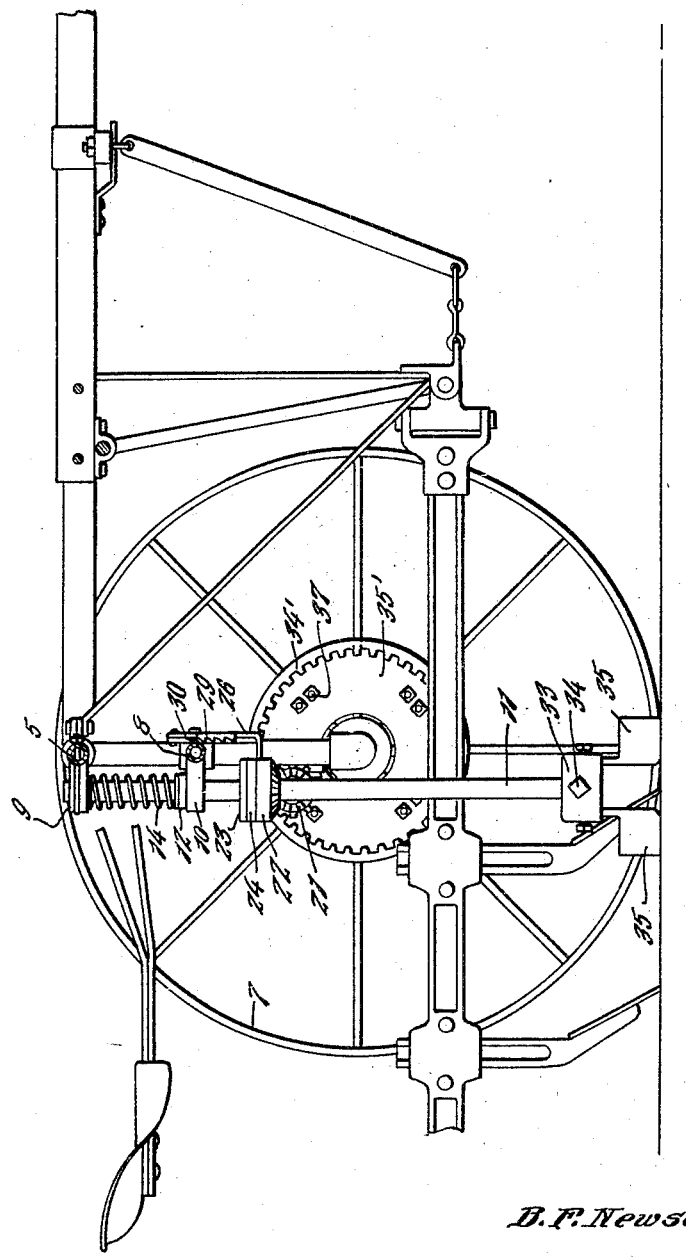
Inventor
B. F. Newsom
By Clarence A. O'Brien
Attorney

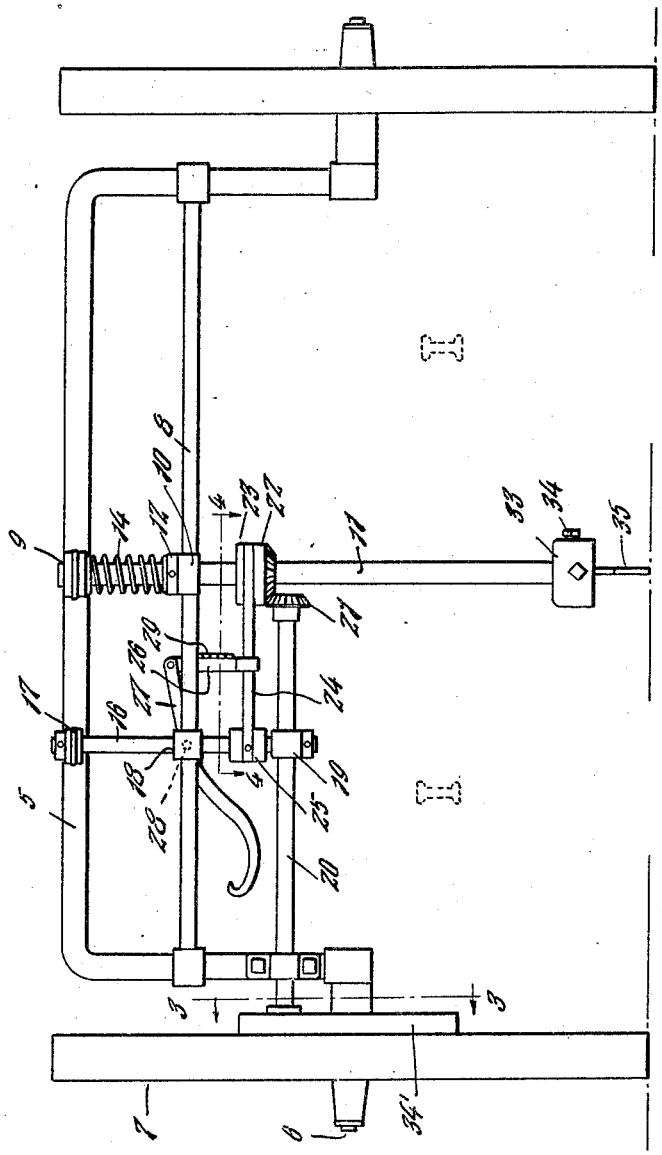

Feb. 12, 1929.
B. F. NEWSOM
1,701,893
COTTON CHOPPER ATTACHMENT FOR CULTIVATORS
Filed April 21, 1928 3 Sheets-Sheet 3
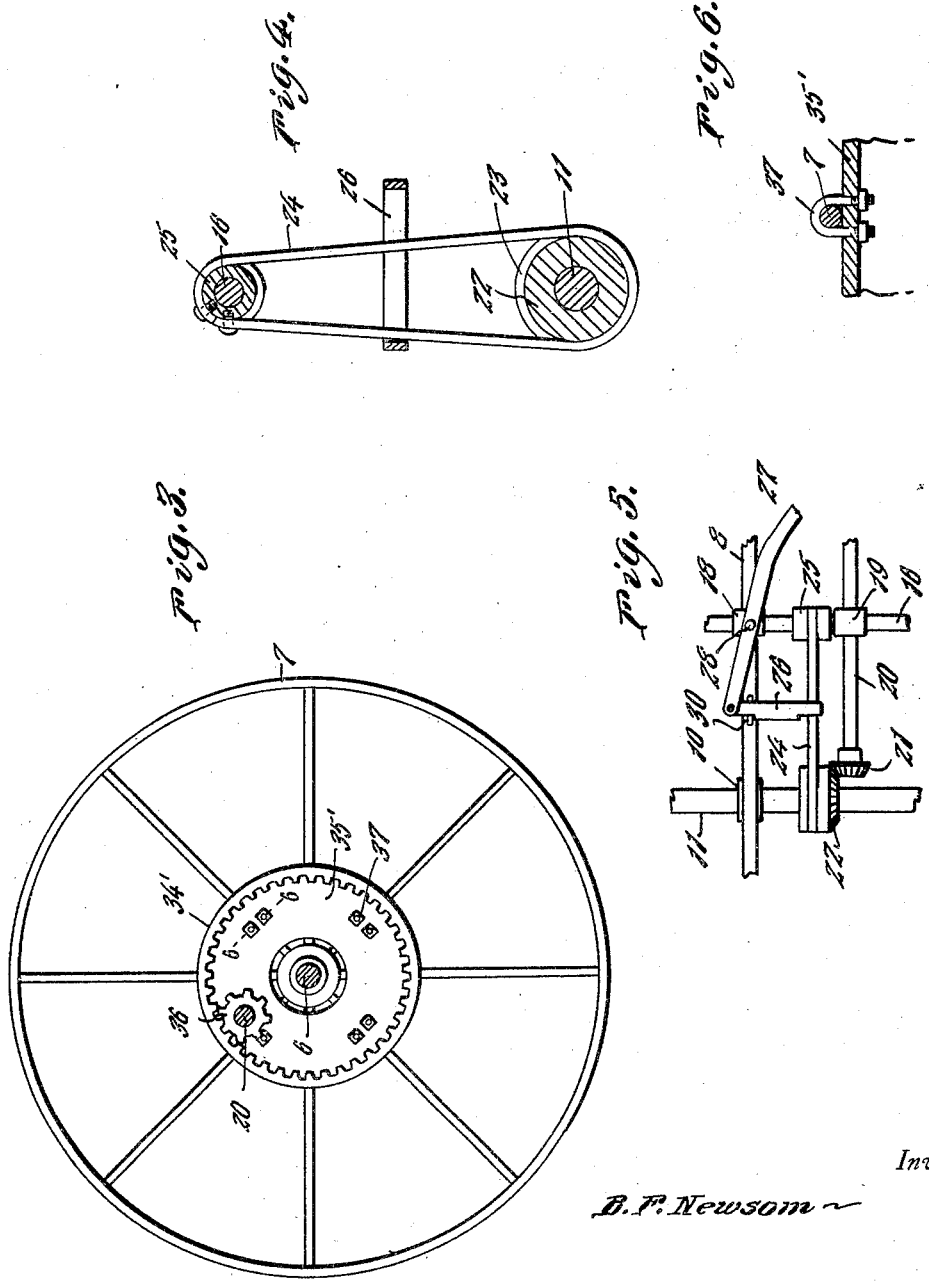
Inventor
B. F. Newsom
By Clarence A. O'Brien
Attorney Patented Feb. 12, 1929.

1,701,893

UNITED STATES PATENT OFFICE.

BENJAMIN FRANKLIN NEWSOM, OF KERENS, TEXAS.

COTTON-CHOPPER ATTACHMENT FOR CULTIVATORS.

Application filed April 21, 1928. Serial No. 271,943.

The present invention relates to a cotton chopper attachment for two row cultivators and has for its prime object to provide a cotton chopper which may be operated from either wheel of the one or two row cultivator and may be mounted in a unitary manner with the cultivator frame structure.

Another very important object of the invention resides in the provision of an attachment of this nature which is exceedingly simple in its construction, strong and durable, inexpensive to manufacture and install, easy to manipulate, adjustable, and thoroughly efficient and reliable for the purpose intended.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical longitudinal section through a two row cultivator showing my attachment thereon, Figure 2 is a fragmentary rear elevation of the cultivator showing my attachment thereon, Figure 3 is a vertical detail section taken substantially on the line 3—3 Figure 2, Figure 4 is a detail horizontal section taken substantially on the line 4—4 of Figure 2, Figure 5 is a fragmentary detail front elevation showing particularly the control means for the attachment, Figure 6 is an enlarged detail section taken substantially on the line 6—6 of Figure 3, and Figure 7 is a bottom plan view of the cotton chopper blade structure.

Referring to the drawing in detail it will be seen that the two row cultivator illustrated in the accompanying drawing for the purpose of exemplifying the utility of my attachment includes among other elements an arched cross frame 5 with the usual stub axles 6 extending outwardly from the extremities thereof and on which are journaled the wheels 7.

I mount a cross bar 8 between intermediate portions of the depending side legs of the cross frame 5 and clamp a bearing to the center of the top portion of the cross frame 5. A bearing 10 is secured to the center of the bar 8 in registry with the bearing 9.

A shaft 11 is rotatable and slidable in the bearings 9 and 10 and is limited in its downward movement by a stock collar 12 secured thereto and against which impinges a spring 14 disposed about the upper portion of the shaft and impinging against its upper end against the bearing 9.

A bar 16 is secured in a bracket 17 mounted on the top portion of the cross frame 5 to one side of the bearing 9 and in a bracket 18 on the bar 8 immediately below the bracket 17 and this bar 16 extends down below the bar 8 and terminates in a bearing 19 in which is journaled a shaft 20, the inner end of which has a pinion 21 fixed thereto meshing with a pinion 22 fixed to the shaft 11.

This pinion 22 is provided with an annular groove 23 for receiving one end of a loop brace 24 the other end of which is secured in a groove of a collar 25 fixed on the lower portion of the bar 16. The collar 25 is slidable on the bar 16 and a link 26 is secured to an intermediate portion of the loop brace 24 and is pivotally engaged with one end of a foot lever 27 which may be actuated from the seat of the cultivator by one foot of the operator.

This lever is loosely pivoted as at 28. A rack 29 is formed on the link for engaging with a lug 30 on the bar 8 for holding the link in different adjusted positions.

Obviously by actuating the lever the rack 29 may be disengaged from the lug and the brace 24 moved upwardly to unmesh the gear 22 from the pinion 21 at the same time lifting the shaft 11 against the tension of the spring 14.

On the lower end of the shaft 12 there is secured a collar 33 by means of set screws 34 or in any other quick detachable manner and on the collar is a pair of cotton chopping blades 35 extending laterally and outwardly with respect to each other.

In the outer end of the shaft 20 there is fixed a pinion 36. An internal gear 37 is formed on the periphery of a plate 35. This plate 35 is secured to the spokes of one of the wheels 7 by means of U-bolts 37 so that the gear 34′ is concentric in respect to the wheel and meshes with the pinion 36.

Therefore it will be seen that as the cultivator moves along, the gear 34′ meshing with the gear or pinion 36 rotates the shaft 20 thereby rotating the shaft 11 through gears 21 and 22. When it is desired to place the cotton chopper out of operation it is only necessary to press down on the outer end of the lever 27 and the ratchet 29 will engage the dog 30 and hold the parts in a raised position so as to unmesh the gear 22 from the gear 21 and lift the blades 35 from the ground as will be quite apparent.

It is thought that the construction, utility, operation and advantages of this invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a cotton chopper attachment for cultivators; wherein the cultivator includes an arch cross frame, stub axles projecting outwardly from the extremities thereon, and wheels journaled on the axle; a bar between the sides of the arch frame, a bearing on the center of the arch frame, a bearing on the center of the bar, a shaft slidable and rotatable in the bearing, means urging the shaft downwardly, a cotton chopping mechanism on the lower end of the shaft, a gear fixed to the shaft below the bar, a second bar, means for vertically mounting the second bar on the frame and the first bar, a bearing at the lower end of the second bar, a shaft journaled in the bearing, a gear at the inner end of the second mentioned shaft meshing with the first mentioned gear, means operatively connecting the second shaft with one of the wheels, a collar slidable on the second bar, a loop brace connecting the collar and the first mentioned gear, and means for shifting the brace to lift the first mentioned shaft and unmesh the gears.

2. In a cotton chopper attachment for cultivators; wherein the cultivator includes an arch cross frame, stub axles projecting outwardly from the extremities thereon, and wheels journaled on the axle; a bar between the sides of the arch frame, a bearing on the center of the arch frame, a bearing on the center of the bar, a shaft slidable and rotatable in the bearing, means urging the shaft downwardly, a cotton chopping mechanism on the lower end of the shaft, a gear fixed to the shaft below the bar, a second bar, means for vertically mounting the second bar on the frame and the first bar, a bearing at the lower end of the second bar, a shaft journaled in the bearing, a gear at the inner end of the second mentioned shaft meshing with the first mentioned gear, means operatively connecting the second shaft with one of the wheels, a collar slidable on the second bar, a loop brace connecting the collar and the first mentioned gear, and means for shifting the brace to lift the first mentioned shaft and unmesh the gears, said last mentioned means comprising a link engaged with the brace, a lever means for pivotally mounting the lever, said lever being pivotally engaged with the link.

3. In a cotton chopper attachment for cultivators; wherein the cultivator includes an arch cross frame, stub axles projecting outwardly from the extremities thereon, and wheels journaled on the axis; a bar between the sides of the arch frame, a bearing on the center of the arch frame, a bearing on the center of the bar, a shaft slidable and rotatable in the bearing, means urging the shaft downwardly, a cotton chopping mechanism on the lower end of the shaft, a gear fixed to the shaft below the bar, a second bar, means for vertically mounting the second bar on the frame and the first bar, a bearing at the lower end of the second bar, a shaft journaled in the bearing, a gear at the inner end of the second mentioned shaft meshing with the first mentioned gear, means operatively connecting the second shaft with one of the wheels, a collar slidable on the second bar, a loop brace connecting the collar and the first mentioned gear, and means for shifting the brace to lift the first mentioned shaft and unmesh the gears, said last mentioned means comprising a link engaged with the brace, a lever, means for pivotally mounting the lever, said lever being pivotally engaged with the link, a rack on the link, a lug on the first mentioned bar with which the rack is engageable.

In testimony whereof I affix my signature.

BENJAMIN FRANKLIN NEWSOM.